US012739523B2

(12) United States Patent
Kozaki et al.

(10) Patent No.: US 12,739,523 B2
(45) Date of Patent: Sep. 15, 2026

(54) IMAGING DEVICE AND MOBILE APPARATUS

(71) Applicants: Yukio Kozaki, Kanagawa (JP); Hiroyuki Satoh, Kanagawa (JP); Tomohiko Hayashi, Kanagawa (JP); Soya Hatazaki, Kanagawa (JP); Tomohiro Kitagawa, Kanagawa (JP)

(72) Inventors: Yukio Kozaki, Kanagawa (JP); Hiroyuki Satoh, Kanagawa (JP); Tomohiko Hayashi, Kanagawa (JP); Soya Hatazaki, Kanagawa (JP); Tomohiro Kitagawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 37 days.

(21) Appl. No.: 18/929,622

(22) Filed: Oct. 29, 2024

(65) Prior Publication Data

US 2025/0142222 A1 May 1, 2025

(30) Foreign Application Priority Data

Nov. 1, 2023 (JP) ................................ 2023-187826

(51) Int. Cl.
*H04N 23/90* (2023.01)

(52) U.S. Cl.
CPC .................................. *H04N 23/90* (2023.01)

(58) Field of Classification Search
CPC ............................ H04N 23/698; H04N 23/90
See application file for complete search history.

(56) References Cited

U.S. PATENT DOCUMENTS

| | | | | |
|---|---|---|---|---|
| 9,462,184 | B2 * | 10/2016 | Kauff | G02B 27/143 |
| 9,699,379 | B1 * | 7/2017 | Baldwin | H04N 23/698 |
| 10,051,180 | B1 * | 8/2018 | Chen | G06T 3/4038 |
| 10,200,672 | B2 * | 2/2019 | Cole | H04N 13/232 |
| 10,397,549 | B2 * | 8/2019 | Abbas | H04N 23/959 |
| 10,740,627 | B2 * | 8/2020 | Corcoran | H04N 23/698 |
| 11,240,446 | B2 * | 2/2022 | Numata | H04N 23/695 |
| 12,302,001 | B2 * | 5/2025 | Park | G06F 1/1652 |
| 2016/0088287 | A1 * | 3/2016 | Sadi | H04N 13/117<br>348/43 |

FOREIGN PATENT DOCUMENTS

| | | |
|---|---|---|
| JP | H10-145649 A | 5/1998 |
| JP | 2024-051917 A | 4/2024 |

* cited by examiner

*Primary Examiner* — Boubacar Abdou Tchoussou
(74) *Attorney, Agent, or Firm* — XSENSUS LLP

(57) ABSTRACT

An imaging device includes a first imager having a first imaging range; and a second imager having a second imaging range, the second imager being asymmetrical relative to the first imager with respect to a centerline of an overlapping area between the first imaging range and the second imaging range to have a first disparity. The first disparity is smaller than a second disparity of an imaging device comprising a third imager having a third imaging range and a fourth imager having a fourth imaging range. The fourth imager is symmetrical relative to the third imager with respect to the centerline of an overlapping area between the third imaging range and the fourth imaging range.

20 Claims, 9 Drawing Sheets

100

COMPARATIVE EXAMPLE
DISPARITY
Bl
A
Br
260l′
260r′
110′

COMPARATIVE EXAMPLE

COMPARATIVE EXAMPLE

COMPARATIVE EXAMPLE

DISPARITY
Br
Bl
A
260r
260l
110

COMPARATIVE EXAMPLE

COMPARATIVE EXAMPLE

260r
D
110
C
260l

COMPARATIVE EXAMPLE
260r'
110'
C
D
260l'

IMAGING DEVICE AND MOBILE APPARATUS

CROSS-REFERENCE TO RELATED APPLICATIONS

This patent application is based on and claims priority pursuant to 35 U.S.C. § 119 (a) to Japanese Patent Application No. 2023-187826, filed on Nov. 1, 2023, in the Japan Patent Office, the entire disclosure of which is hereby incorporated by reference herein.

BACKGROUND

Technical Field

The present disclosure relates to an imaging device and a mobile apparatus for capturing multiple images to be stitched together.

Related Art

A technology has been developed to stitch images captured by multiple cameras into a single image, such as a wide-angle or 360-degree image.

SUMMARY

The present disclosure described herein provides an imaging device including a first imager having a first imaging range; and a second imager having a second imaging range, the second imager being asymmetrical relative to the first imager with respect to a centerline of an overlapping area between the first imaging range and the second imaging range to have a first disparity. The first disparity is smaller than a second disparity of an imaging device comprising a third imager having a third imaging range and a fourth imager having a fourth imaging range. The fourth imager is symmetrical relative to the third imager with respect to the centerline of an overlapping area between the third imaging range and the fourth imaging range.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
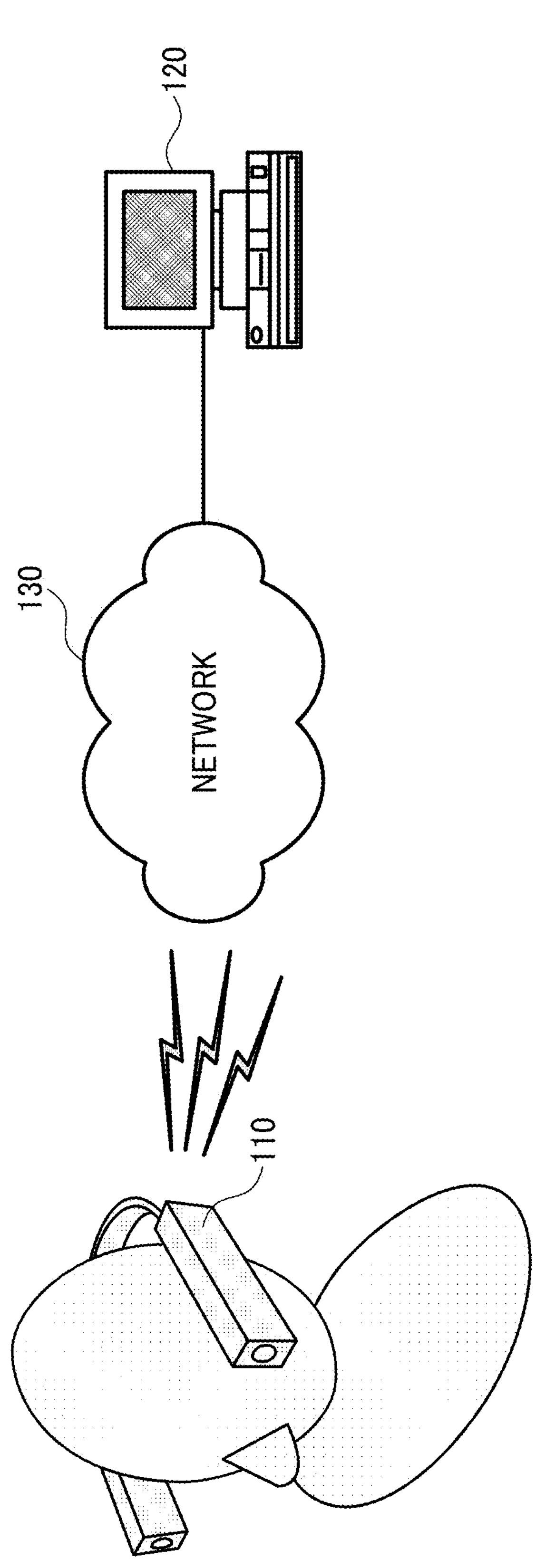
FIG. 1 is a schematic diagram illustrating a hardware configuration of an imaging system as a whole.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For example, a configuration with multiple cameras placed close to each other is known. This configuration can minimize a disparity between the images captured by the cameras.

In recent years, wearable devices that can be worn on parts of the use's body, such as the head, have been developed. Some of these devices include image-capturing functions.

However, wearable devices equipped with multiple cameras often face challenges in placing the cameras close together due to their restriction of being worn on the user's body. Thus, such wearable devices result in a greater disparity between the cameras, increasing processing load involved in stitching images together through pattern matching.

In view of the above, there is a need for technology in imaging devices with multiple cameras to acquire images that are easy to stitch together.

According to one aspect of the present disclosure, an imaging device that captures images easy to stitch together, and a mobile apparatus incorporating the imaging device, are provided.

Some embodiments of the present disclosure are described below. However, the present disclosure is not limited to the embodiments described herein. In the drawings referred to below, the same or similar reference codes are used for the common or corresponding components, and redundant descriptions are omitted as appropriate.

FIG. 1 is a schematic diagram illustrating a hardware configuration of an imaging system 100 as a whole. FIG. 1 illustrates, as an example, an environment in which an imaging device 110, an information processing device 120 are connected to each other via a network 130 such as the Internet or a local area network (LAN). The number of imaging devices 110 and information processing devices 120 is not limited to that illustrated in FIG. 1; and there is no restriction on the number of those included in the imaging system 100. The imaging device 110 and the information processing device 120 may be connected to the network 130 by a wired or wireless method.

The imaging device 110 is a device worn by a user, such as a wearable device, to capture images of the user's surroundings. The imaging device 110 illustrated in FIG. 1 is designed to be worn on the user's head. However, this is not a limitation of the embodiment, and the device can be worn on any part of the user's body. The imaging device 110 includes at least two cameras, and can generate a wide-angle image, such as a panoramic image or spherical image, by stitching together the images captured by the cameras. Images captured by the imaging device 110 may be still images or moving images. In the present embodiment described below, a wearable device is given as an example of the imaging device 110, but the embodiment is not particularly limited thereto, and the imaging device may be in a form other than a wearable device.

The information processing device 120 is, for example, an apparatus such as a personal computer. The information processing device 120 receives images captured by the imaging device 110 and performs processes such as generating a wide-angle image and displaying images. The form of the information processing device 120 is not limited to a personal computer; it may also be, for example, a smartphone or a tablet.

Figure 2A:
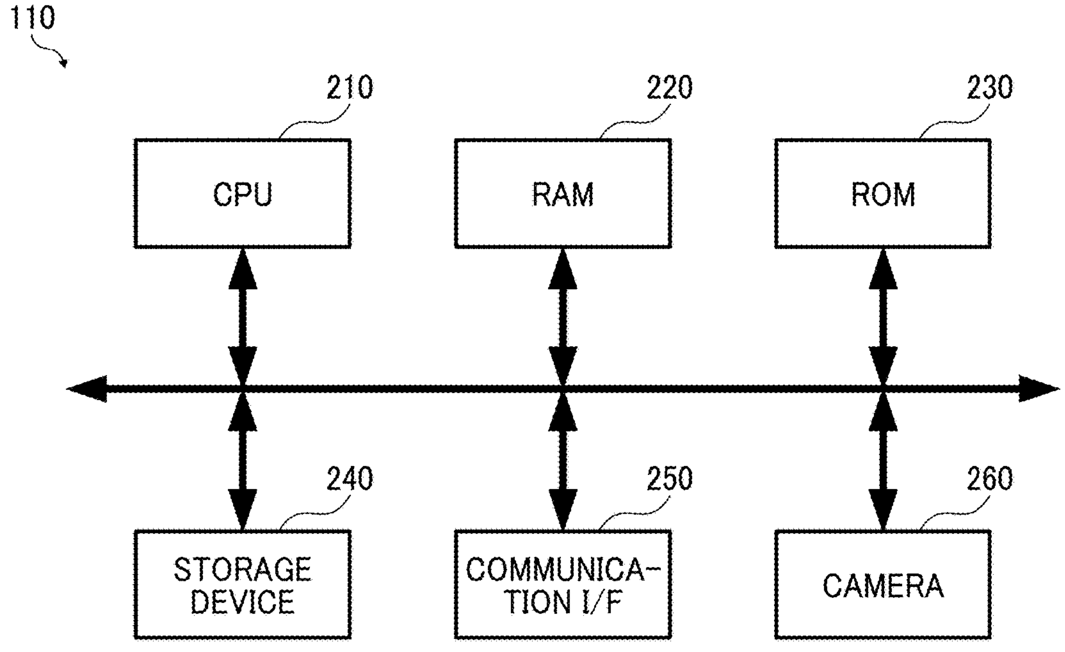
FIGS. 2A and 2B are diagrams each illustrating a hardware configuration included in the imaging system of FIG. 1.
Figure 2B:
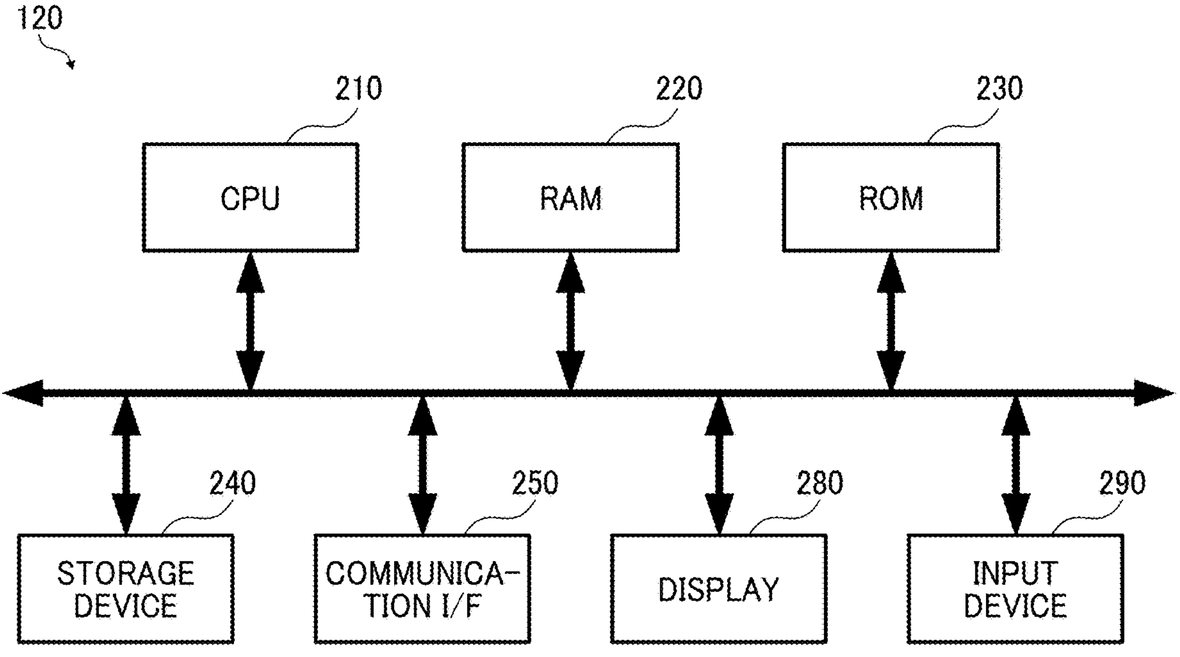

The hardware configurations of the imaging device 110 and the information processing device 120 are described below. FIGS. 2A and 2B are diagrams illustrating the hardware configurations included in the devices of the imaging system 100. FIG. 2A illustrates an example of the imaging device 110. FIG. 2B illustrates an example of the information processing device 120.

The imaging device 110 is first described below. As illustrated in FIG. 2A, the imaging device 110 includes a central processing unit (CPU) 210, a random-access memory (RAM) 220, a read-only memory (ROM) 230, a memory 240, a communication interface (I/F) 250, a camera 260, and a sensor 270, which are connected to each other through a bus.

The CPU 210 executes a program for controlling the operation of the imaging device 110 to perform prescribed processing. The RAM 220 is a volatile storage device to provide a work area for the CPU 210 executing programs. The RAM 220 is used to store and load programs and data. The ROM 230 is a non-volatile storage device for storing, for example, programs or firmware to be executed by the CPU 210.

The memory 240 is a readable and writable non-volatile memory that stores operating system (OS) for operating the imaging device 110, various software, setting information, or various data. Examples of the memory 240 typically include a hard disk drive (HDD) or a solid-solid-state drive (SSD), but the embodiment is not particularly limited to them. The memory 240 may also be a removable storage medium, such as an SD card.

The communication I/F 250 connects the imaging device 110 to the network 130, enabling communication with other devices via the network 130. Communications via the network 130 may be either wired communications or wireless communications, and various data can be transmitted and received using a predetermined communication protocol such as a transmission control protocol/internet protocol (TCP/IP).

The camera 260 is a device including a lens optical system and a solid-state imaging element and can capture images. The image captured by the camera 260 may be a still image or a moving image. The camera 260 may be a wide-angle camera with an angle of view of 180 degrees or more. The imaging device 110 include at least two cameras 260. The camera 260 is an example of an imager.

The information processing device 120 is described below. As illustrated in FIG. 2B, the information processing device 120 includes a CPU 210, a RAM 220, a ROM 230, a memory 240, a communication I/F 250, a display 280, and an input device 290, which are connected to each other through a bus. The CPU 210, the RAM 220, the ROM 230, the memory 240, and the communication I/F 250 are similar to those of the imaging device 110 described with reference to FIG. 2A, and thus a detailed description thereof will be omitted.

The display 280 is a device that displays various data, images, and the status of the information processing device 120 to the user. Examples include a liquid crystal display (LCD). The input device 290 allows the user to operate the information processing device 120 and may be, for example, a keyboard or a mouse. The display 280 and the input device 290 may be separate devices, or may be combined into a single device, such as a touch panel display.

Figure 3:
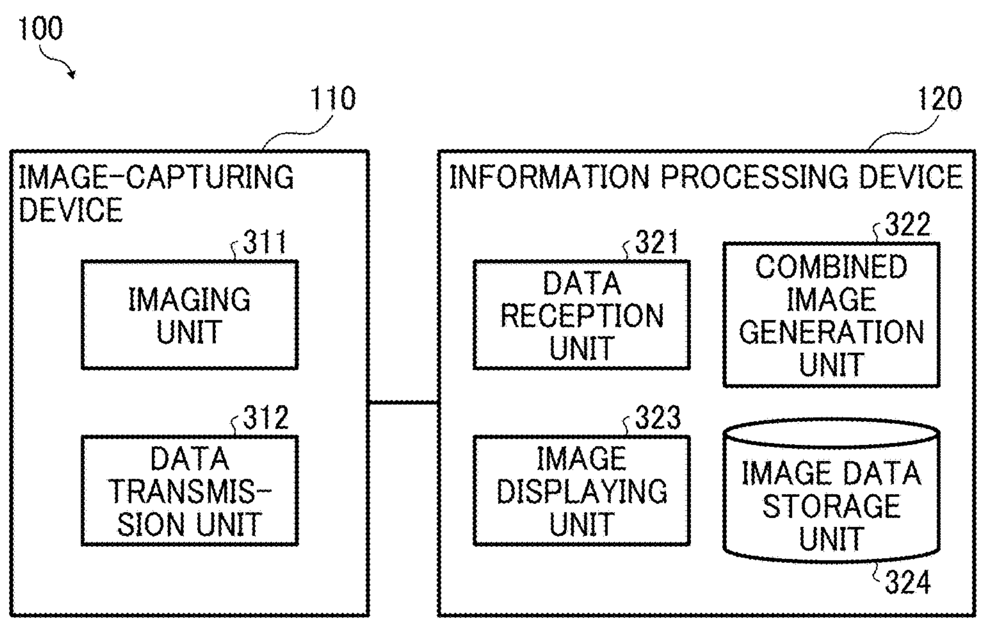
FIG. 3 is a block diagram of a software configuration included in an imaging system.

The hardware configurations of the imaging device 110 and the information processing device 120 are as described above. Functional units executed by one or more of the hardware components are described below with reference to FIG. 3. FIG. 3 is a block diagram of a software configuration of the imaging system 100.

As illustrated in FIG. 3, the imaging device 110 includes functional units of an imaging unit 311 and a data transmission unit 312. The information processing device 120 includes functional units such as a data reception unit 321, a composite image generation unit 322, an image displaying unit 323, and an image data storage unit 324. The functional units are described in detail below.

The functional units of the imaging device 110 is described below. The imaging unit 311 is implemented by the imager, which controls the camera 260 to capture images as image data.

The data transmission unit 312 controls the communication I/F 250 of the imaging device 110 and transmits the image captured by the imaging unit 311 to the information processing device 120 via the network 130. The data transmission unit 312 is an example of a transmitter.

The functional units of the information processing device 120 is described below. The data reception unit 321 controls the communication I/F 250 of the information processing device 120 and receives various kinds of information from the data transmission unit 312 of the imaging device 110. The data reception unit 321 is an example of a receiver.

The composite image generation unit 322 is an example of an image generator. The data reception unit 321 performs pattern matching on images received from the imaging device 110 and generates a composite image by stitching together multiple images. The composite image generation unit 322 generates, for example, a panoramic image or a full view spherical image.

The image displaying unit 323 controls the display 280 to display the image generated by the composite image generation unit 322. The image displaying unit 323 is an example of a displaying unit.

The image data storage unit 324 controls the memory 240 to store the image generated by the composite image generation unit 322. The image data storage unit 324 is an example of a memory.

The software configuration described above corresponds to functional units. Each of the functional units is implemented by the CPU 210 executing a program of the present embodiment to cause corresponding one or more of the hardware components to function. In any one of the embodiments, all of the functional units may be implemented by software, hardware, or a combination of software and hardware.

Further, all of the above-described functional units may not be included in the configuration as illustrated in FIG. 3. In another preferred embodiment, the imaging device 110 may have the functional units included in the information processing device 120 in FIG. 3 and generate a composite image. In another example, each functional unit may be implemented through the cooperation of the imaging device 110 and the information processing device 120.

Figure 4:
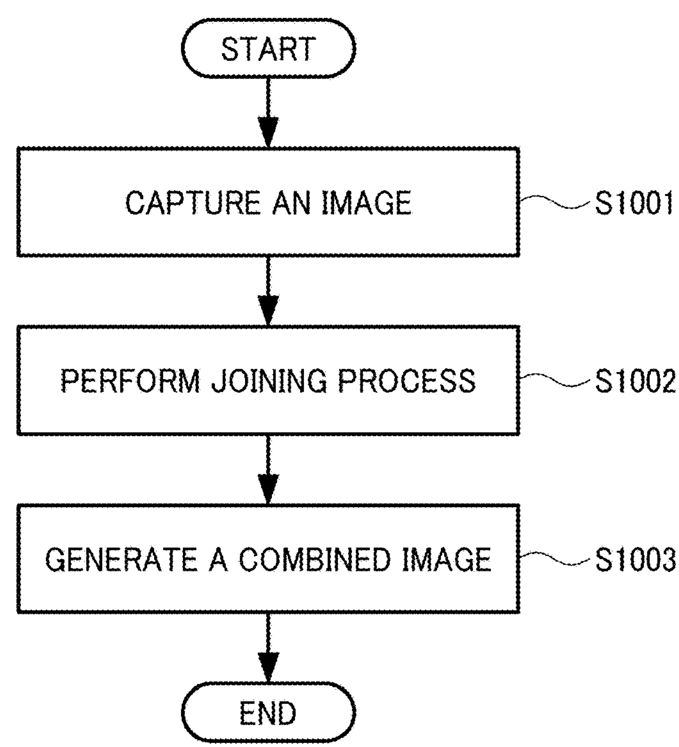
FIG. 4 is a flowchart of processing executed by an imaging system.

A process of generating a composite image using the above-described functional units is described with reference to FIG. 4. FIG. 4 is a flowchart of processing executed by the imaging system 100.

The imaging system 100 starts the process of generating a composite image. In step S1001, the imaging unit 311 of the imaging device 110 controls the camera 260 to capture an image. In step S1001, multiple cameras 260 captures multiple images. The captured images are transmitted from the imaging device 110 to the information processing device 120 via the network 130.

In step S1002, the composite image generation unit 322 performs a stitching process on the images captured in step S1001. The composite image generation unit 322 can perform pattern matching based on a common subject included in the captured images and stitch together the images.

In step S1003, the composite image generation unit 322 generates a single composite image from the captured images. The composite image generated in step S1003 may be, for example, a panoramic image or a spherical image. The generated composite image may be displayed by the image displaying unit 323 or may be stored in the image data storage unit 324.

Then, the imaging system 100 ends the stitching process. Through the stitching process of FIG. 4, the imaging system 100 stitches together the captured images to generate a composite image, such as a panoramic image or a spherical image.

The following first describes an imaging device 110' according to a comparative example with reference to FIGS. 5A, 5B, 5C, and 5D, as a basis for understanding the more specific configuration of the imaging device 110 according to the present embodiment. FIGS. 5A, 5B, 5C, and 5D are diagrams illustrating an imaging device 110' according to a comparative example.

Figures 5A, 5B, 5C, 5D:
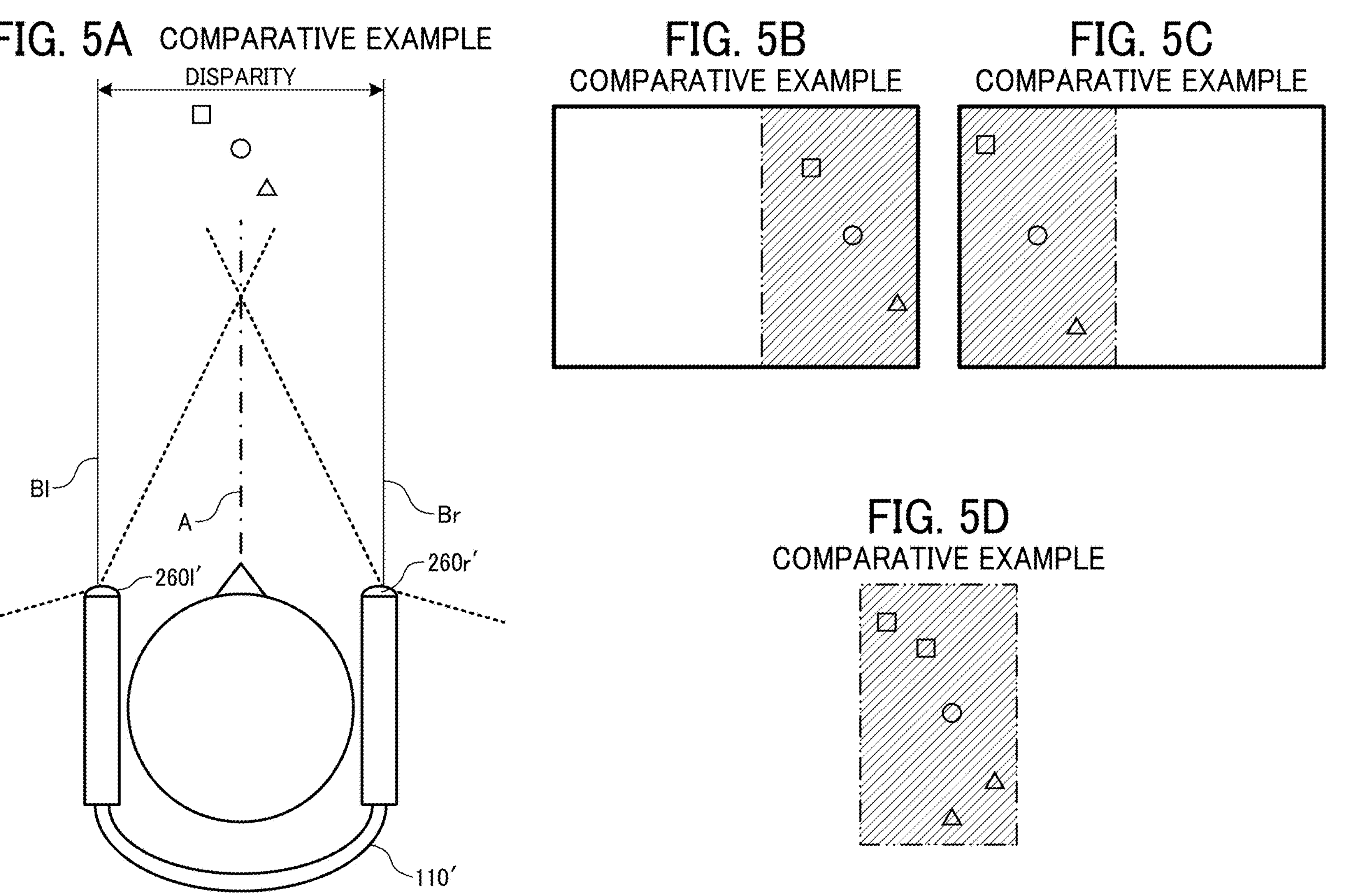
FIGS. 5A, 5B, 5C, and 5D are diagrams illustrating an imaging device according to a comparative example.

FIG. 5A illustrates the configuration of the imaging device 110' according to the comparative example with two cameras **260*l*' and 260*r*'. The broken lines in FIG. 5A indicate the imaging ranges of the cameras 260*l*' and 260*r*', respectively. The dot-and-dash line A in FIG. 5A indicates the centerline of an overlapping area between the imaging ranges of the cameras 260*l*' and 260*r*'. The lines Bl and Br in FIG. 5A pass through the entrance pupil positions of the cameras 260*l*' and 260*r*'** and are parallel to the dot-and-dash line A. The entrance pupil positions refer to the point where an extension of the principal ray intersects the optical axis, disregarding the influence of lenses in an image-forming optical system. In the following description, the distance between the lines Bl and Br is referred to as a disparity.

In the imaging device 110' as illustrated in FIG. 5A as a comparative example, the cameras **260*l*' and 260*r*' are arranged symmetrically with respect to the centerline of the imaging device 110'. In other words, the cameras 260*l*' and 260*r*' are arranged so that their imaging ranges are symmetric with respect to the dot-and-dash line A. In this configuration, capturing three objects, such as a square, a circle, and a triangle, as illustrated in FIGS. 5A, 5B, 5C, and 5D, is considered. In FIG. 5A, the object marked by a circle (i.e., Object Circle) is assumed to be positioned at the reference distance, which serves as the basis for stitching images. The object marked by a square (i.e., Object Square) is assumed to be positioned farther from the cameras 260*l*' and 260*r*' than the reference distance. The object marked by a triangle (i.e., Object Triangle) is positioned closer to the cameras 260*l*' and 260*r*'** than the reference distance.

FIG. 5B is a diagram of an image captured by the camera **260*l*' at the left of the imaging device 110'. FIG. 5C is a diagram of an image captured by the camera 260*r*' at the right of the imaging device 110'. The hatched areas illustrated in FIGS. 5B and 5**C each indicate an overlapping area between the images captured by the cameras.

The images from FIGS. 5B and 5C are stitched together to generate one composite image. The stitching together of the images can be performed, for example, by pattern matching of the subjects included in the overlapping area. FIG. 5D is a diagram of the aligned overlapping areas of the images.

As illustrated in FIG. 5D, the Object Circle, which is positioned at the reference distance, appears in the same position within the overlapping area. The Object Square and the Object Triangle, which are positioned at distances different from the reference distance, appear in different positions within the overlapping area between the image of the camera **260*l*' and the image of the camera 260*r*', as illustrated in FIG. 5D. In the imaging device 110', which has a large disparity, the Object Square captured by the camera 260*l*' and the Object Square captured by the camera 260*r*' appear separated within the overlapping area. Similarly, the Object Triangle captured by the camera 260*l*' and the Object Triangle captured by the camera 260*r*'** appear separated within the overlapping area.

As described above, if the same subjects appear separated within the overlapping area, a larger range needs to be searched for pattern matching during the stitching process, increasing the time to generate a composite image. In view of the above, in the present embodiment, cameras are arranged to reduce the disparity between the cameras.

Figures 6A, 6B, 6C, 6D:
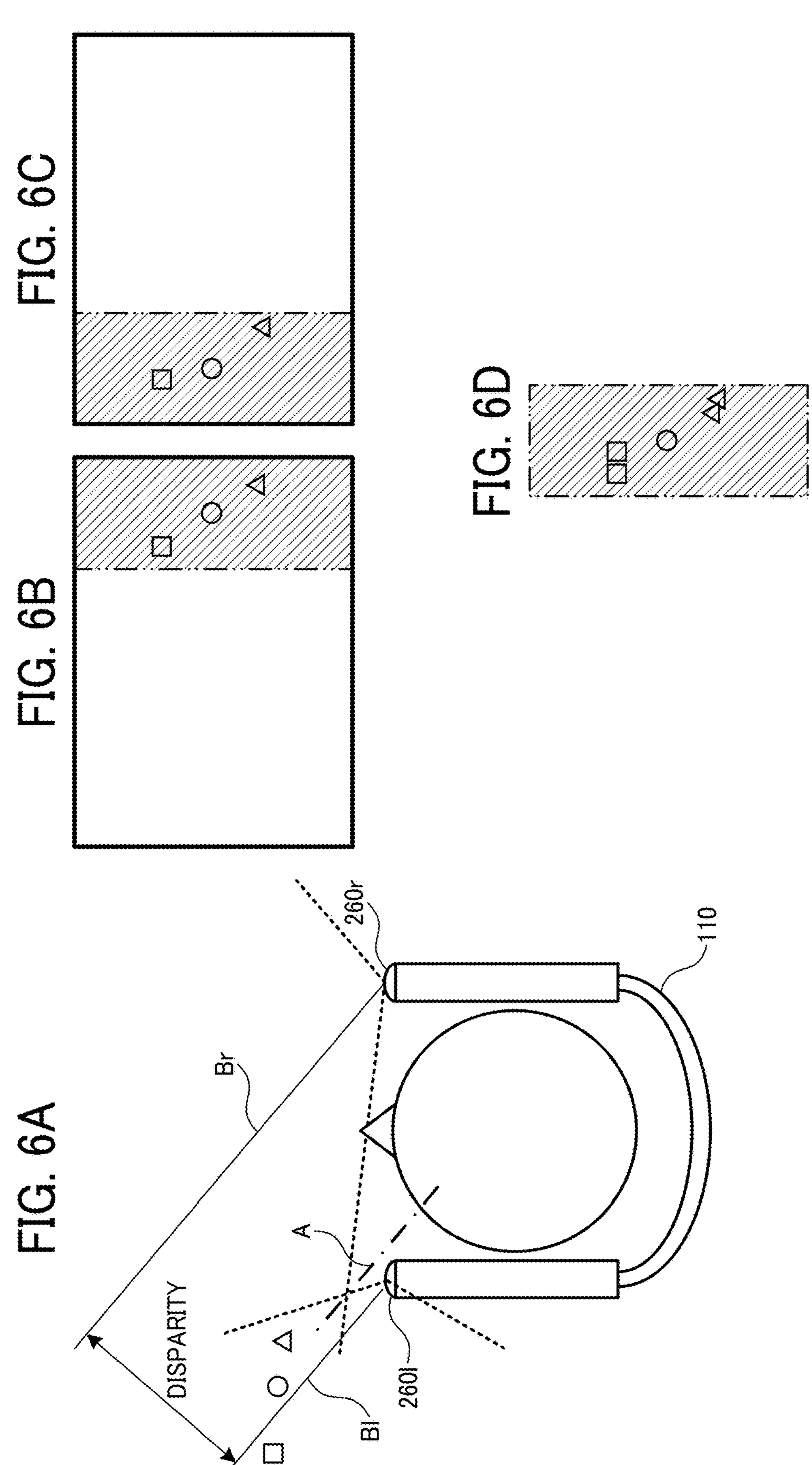
FIGS. 6A, 6B, 6C, and 6D are diagrams illustrating an imaging device.

FIGS. 6A, 6B, 6C, and 6D are diagrams illustrating an imaging device 110 of the present embodiment. In the imaging device 110 as illustrated in FIG. 6A, cameras **260*l* and 260*r* are arranged to have a smaller disparity than that of the imaging device 110' illustrated in FIGS. 5A, 5B, 5C, and 5D according to the comparative example. To reduce the disparity, for example, the cameras 260*l* and 260*r* are arranged so that their imaging ranges are asymmetric with respect to the central axis of the imaging device 110 in the front-to-back direction. With this arrangement, the disparity of the imaging device 110 in FIG. 6A can be smaller than that of the imaging device 110' illustrated in FIG. 5**A in the comparative example.

In this configuration, capturing three objects, such as a square, a circle, and a triangle, as illustrated in FIGS. 6A, 6B, 6C, and 6D, is considered. The relative positions between the objects and the reference distance are the same as those of FIGS. 5A, 5B, 5C, and 5D. FIG. 6B is a diagram of an image captured by the camera **260*l* at the left of the imaging device 110. FIG. 6C is a diagram of an image captured by the camera 260*r* at the right of the imaging device 110. The hatched areas illustrated in FIGS. 5B and 5**C each indicate an overlapping area between the images captured by the cameras.

The images from FIGS. 6B and 6C are stitched together to generate one composite image. The stitching together of the images can be performed, for example, by pattern matching of the subjects included in the overlapping area. FIG. 6D is a diagram of the aligned overlapping areas of the images.

As illustrated in FIG. 6D, the Object Circle, which is positioned at the reference distance, appears in the same position within the overlapping area. The Object Square and the Object Triangle, which are positioned at distances different from the reference distance, appear in different positions within the overlapping area between the image of the camera **260*l* and the image of the camera 260*r*, as illustrated in FIG. 6D. Due to the disparity between the cameras 260 of the imaging device 110, the Object Square captured by the camera 260*l* and the Object Square captured by the camera 260*r* appear separated within the overlapping area. Similarly, the Object Triangle captured by the camera 260*l* and the Object Triangle captured by the camera 260*r*** also appear separated within the overlapping area.

However, in the imaging device 110, which has a smaller disparity than the imaging device 110', the distance between the Object Squares and the distance between the Object Triangles are smaller than those illustrated in FIG. 5D.

In the present embodiment, the range to be searched within the images during pattern matching for stitching together the images, shortening the time to generate a composite image. Further, with a smaller disparity between the images, the difference in the direction for capturing the same subject can be minimized, making it less likely for shape differences to occur within the images. This reduces the likelihood of errors in pattern matching.

With the arrangement of the cameras 260 as illustrated in FIG. 6A, the area not captured by each camera (or the blind area) can be reduced compared to the arrangement illustrated in FIG. 5A. Consequently, the imaging device 110 of the present embodiment can generate a composite image that more comprehensively covers the area around the imaging device 110.

A first imager (e.g., the camera **260*r*) having a first imaging range is asymmetrical relative to a second imager (e.g., the camera 260*l***) having a second imaging range with respect to a centerline of an overlapping area between the first imaging range and the second imaging range.

Figures 7A, 7B:
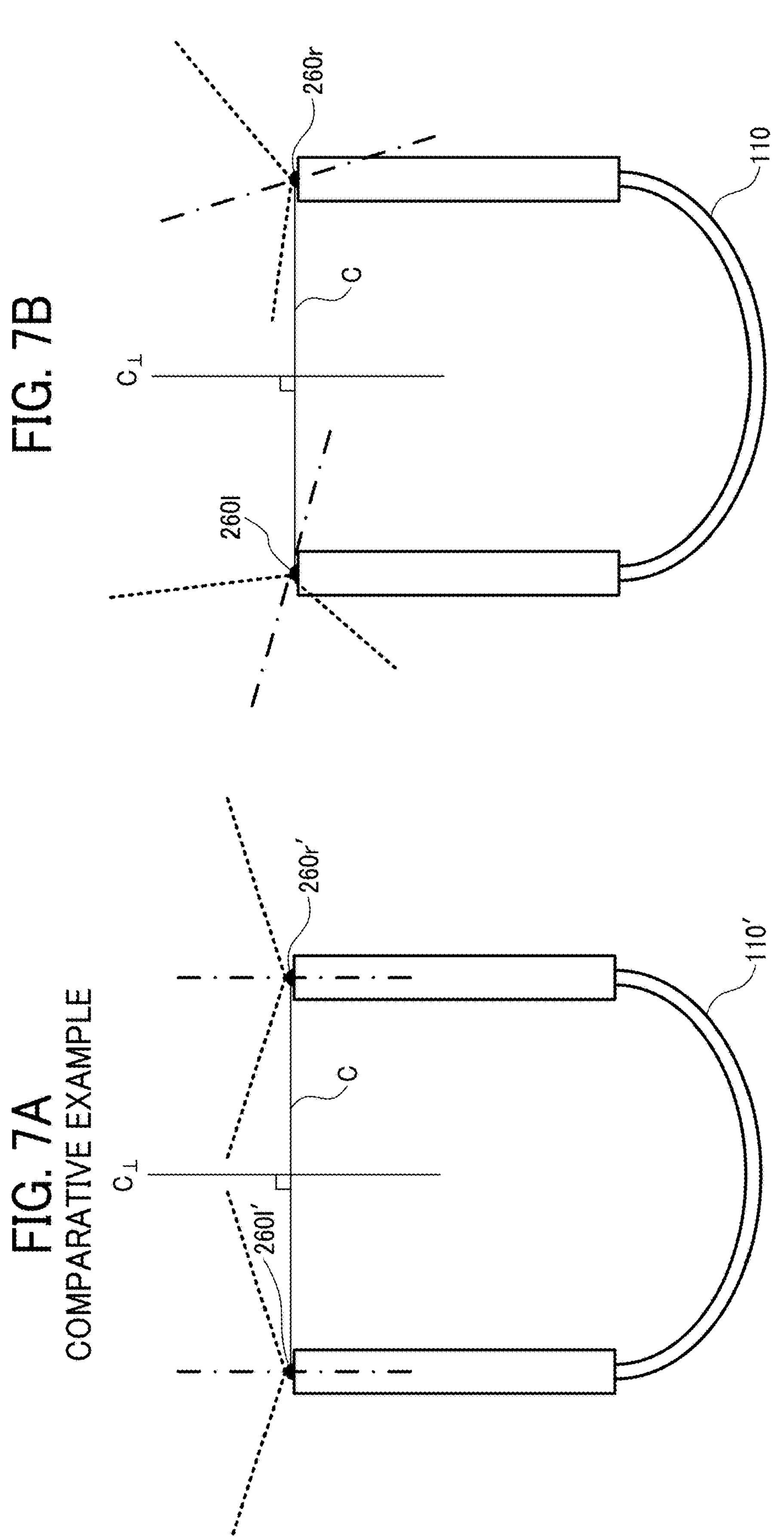
FIG. 7A is a diagram illustrating an imaging device according to a comparative example.
FIG. 7B is a diagram illustrating an imaging device.
Figure 8B:
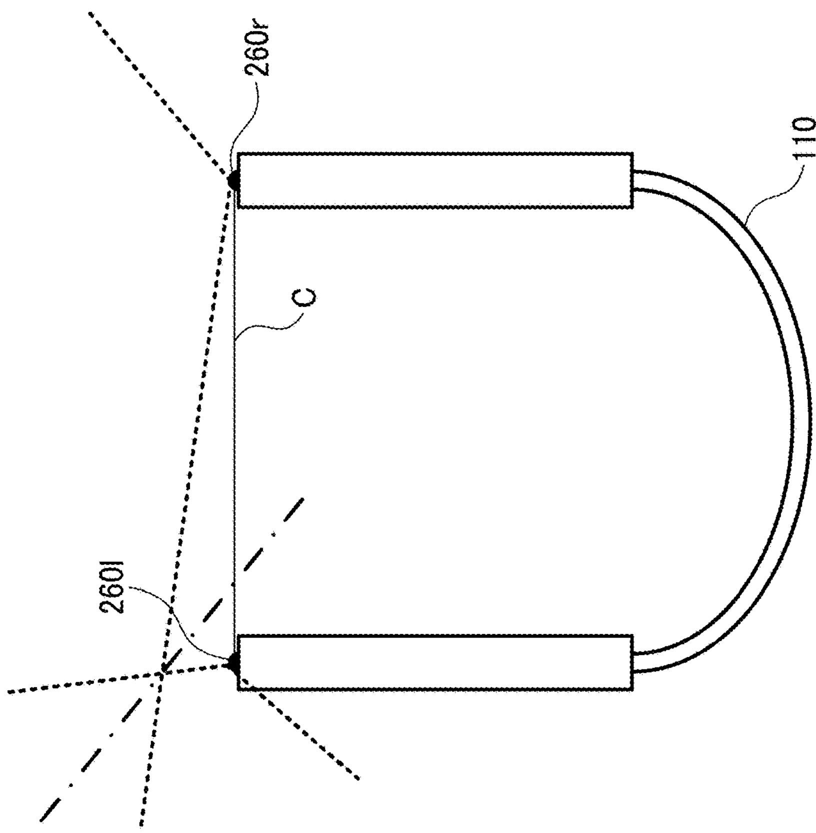
FIG. 8B is a diagram illustrating an imaging device.
Figure 8A:
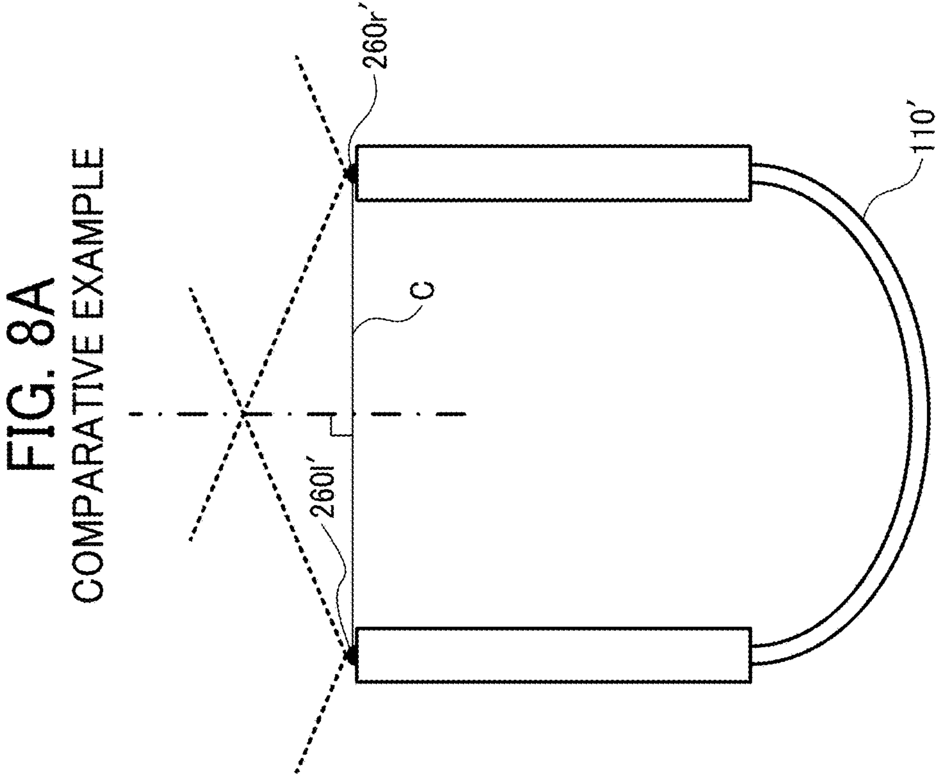
FIG. 8A is a diagram illustrating an imaging device according to a comparative example.
Figure 9B:
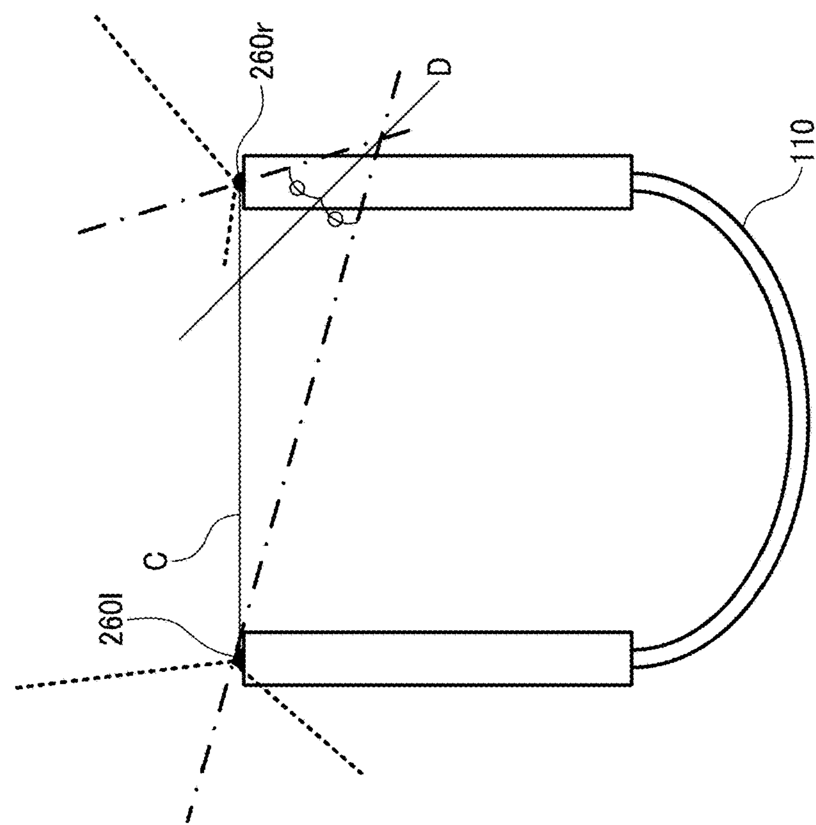
FIG. 9B is a diagram illustrating an imaging device.

The following describes first to third examples of the imaging device 110 with reference to FIGS. 7B, 8B, and 9B. FIGS. 7B, 8B, and 9B are diagrams illustrating first to third examples of the imaging device 110. FIGS. 7A, 8B, and 9C illustrate the configurations of an imaging device 110' according to comparative examples. FIGS. 7B, 8B, and 9B illustrate the configurations of an imaging device 110 according to the present embodiment. In each of FIGS. 7A to 9B, the broken lines indicate an imaging range captured by the cameras.

The first example of the imaging device 110 is described with reference to FIGS. 7A and 7B. In the imaging device 110' according to a comparative example as illustrated in FIG. 7A, cameras **260*l*' and 260*r*' are arranged so that the optical axes of the cameras 260*l*' and 260*r*' are symmetric with respect to the perpendicular bisector C⊥ of the line C connecting the cameras 260*l*' and 260*r*'. The optical axes are indicated by dot-and-dash lines in the figure. In the first example of the imaging device 110 illustrated in FIG. 7B, cameras 260*l* and 260*r* are arranged so that the optical axes of the cameras 260*l* and 260*r* are asymmetric with respect to the perpendicular bisector C⊥ of the line C connecting the cameras 260*l* and 260*r***. The optical axes are indicated by dot-and-dash lines in the figure.

A first imager (e.g., a camera **260*l*) having a first optical axis is asymmetrical relative to a second imager (e.g., a camera 260*r***) having a second optical axis with respect to a perpendicular bisector of a line connecting the first imager and the second imager.

The second example of the imaging device 110 is described below with reference to FIGS. 8A and 8B. In the imaging device 110' according to a comparative example illustrated in FIG. 8A, cameras **260*l*' and 260*r*' are arranged so that line C connecting the cameras 260*l*' and 260*r*' is orthogonal to the centerline passing through the overlapping area between the images captured by the cameras 260*l*' and 260*r*'. However, in the second example of the imaging device 110 illustrated in FIG. 8B, cameras 260*l* and 260*r* are arranged so that line C connecting the cameras 260*l* and 260*r* is not orthogonal to the centerline passing through the overlapping area between the images captured by the cameras 260*l* and 260*r***.

Figure 9A:
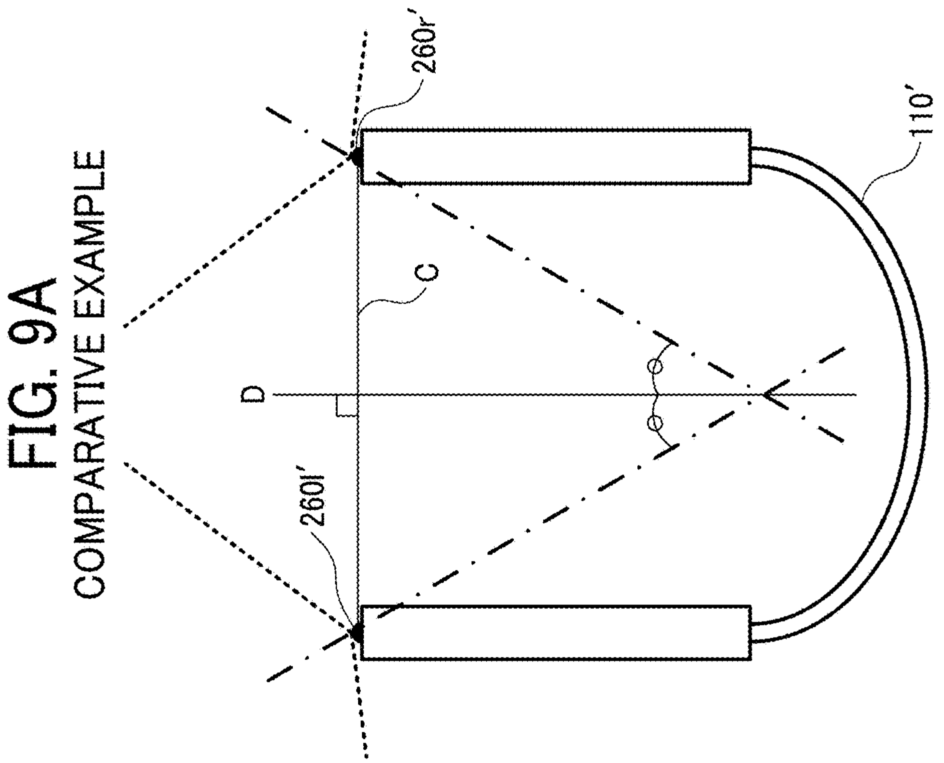
FIG. 9A is a diagram illustrating an imaging device according to a comparative example.

The third example of the imaging device 110 is described below with reference to FIGS. 9A and 9B. In the imaging device 110' according to a comparative example as illustrated in FIG. 9A, cameras **260*l*' and 260*r*' are arranged so that the line C connecting the cameras 260*l*' and 260*r*' is orthogonal to the bisector D of the angle formed by the optical axes of the cameras 260*l*' and 260*r*'. The angle is indicated by the dot-and-dash lines in the figure. In the third example of the imaging device 110 illustrated in FIG. 9B, cameras 260*l* and 260*r* are arranged so that the line C connecting the cameras 260*l* and 260*r* is not orthogonal to the bisector D of the angle formed by the optical axes of the cameras 260*l* and 260*r***. The angle is indicated by the dot-and-dash lines in the figure.

With the arrangement of the cameras as illustrated in FIGS. 7B, 8B, and 9B, the disparity between the cameras can be reduced, as described in FIGS. 6A, 6B, 6C, and 6D. This can shorten the time for pattern matching and enable the capture of images that are easier to stitch together.

In the above description, the imaging device 110 with two cameras 260 is used as an example. However, the number of cameras is not limited to two. The imaging device 110 may include any number of cameras 260, including three or more.

Figure 10:
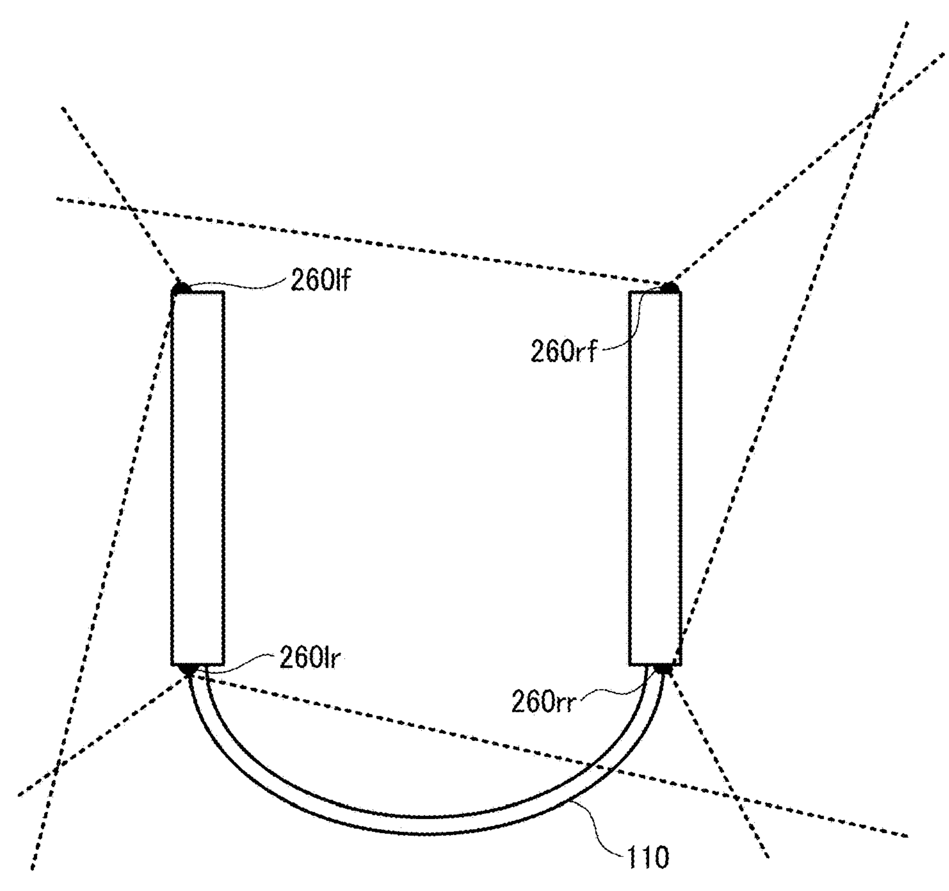
FIG. 10 is a diagram of an imaging device with four cameras.

An example of the imaging device 110 with four cameras 260 is described below with reference to FIG. 10. FIG. 10 is a diagram of an imaging device 110 with four cameras 260.

The imaging device 110 illustrated in FIG. 10 includes four cameras 260, which are a camera **260*lf* positioned at the right front, a camera 260*rf* at the left front, a camera 260*lr* at the right rear, and a camera 260*rr* at the left rear. In the imaging device 110 illustrated in FIG. 10, the cameras 260 are arranged such that the disparity between each pair of adjacent cameras is reduced. The cameras 260 are arranged to reduce the disparity between the camera 260*lf* and the camera 260*rf*; the disparity between the camera 260*rf* and the camera 260*rr*; the disparity between the camera 260*rr* and the camera 260*lr***; and the disparity between the camera

260*lr* and the camera 260*lf*. The disparity between the cameras can be reduced by applying the methods illustrated in FIGS. 7B, 8B, and 9B.

The arrangement of the cameras as illustrated in FIG. 10 enables the capture of images that are easier to stitch together. This reduces the time for image processing, such as pattern matching.

The number of cameras 260 as illustrated in FIG. 10 is only one example, and is not limited to four. Any number of cameras 260 may be used as long as the cameras are arranged to reduce the disparity between adjacent cameras.

In an example of the imaging device 110, a first imager (e.g., a camera 260*lf*) having a first imaging range is asymmetrical relative to a second imager (e.g., a camera 260*rf*) having a second imaging range with respect to the centerline of an overlapping area between the first imaging range and the second imaging range to have a first disparity. The first disparity is smaller than a second disparity of an imaging device comprising a third imager having a third imaging range and a fourth imager having a fourth imaging range. The fourth imager is symmetrical relative to the third imager with respect to the centerline of an overlapping area between the third imaging range and the fourth imaging range.

In another example of the imaging device 110, the imaging device 110 further includes a third imager (e.g., a camera 260*rr*) and a fourth imager (e.g., a camera 260*lr*). The third imager (e.g., a camera 260*rr*) is adjacent to the second imager (e.g., a camera 260*rf*) and has a third imaging range, the third imager being asymmetrical relative to the second imager with respect to a centerline of an overlapping area between the second imaging range and the third imaging range. The fourth imager (e.g., a camera 260*lr*) is adjacent to the first imager (e.g., a camera 260*lf*) and the third imager (e.g., the camera 260*rr*), and has a fourth imaging range. The fourth imager is asymmetrical relative to the first imager with respect to a centerline of an overlapping area between the first imaging range and the third imaging range. The fourth imager is asymmetrical relative to the third imager with respect to a centerline of an overlapping area between the third imaging range and the fourth imaging range.

In another example of the imaging device 110, a first imager (e.g., a camera 260*lf*) having a first optical axis is asymmetrical relative to a second imager (e.g., a camera 260*rf*) having a second optical axis with respect to a perpendicular bisector of a line connecting the first imager and the second imager.

The imaging device 110 further includes a third imager (e.g., a camera 260*rr*) and a fourth imager (e.g., a camera 260*lr*). The third imager (e.g., a camera 260*rr*) is adjacent to the second imager (e.g., a camera 260*rf*) and has a third optical axis, the third optical axis being asymmetrical relative to the second optical axis with respect to a perpendicular bisector of a line connecting the second imager and the third imager.

The fourth imager (e.g., a camera 260*lr*) is adjacent to the first imager (e.g., a camera 260*rl*) and the third imager (e.g., a camera 260*rr*) and has a fourth optical axis, the fourth optical axis being asymmetrical relative to the first optical axis with respect to a perpendicular bisector of a line connecting the first imager and the fourth imager, and the fourth imager being asymmetrical relative to the third imager with respect to a centerline of an overlapping area between the third imaging range and the fourth imaging range.

In another example of the imaging device 110, a first imager (e.g., a camera 260*lf*) has a first imaging range, and a second imager (e.g., a camera 260*rf*) has a second imaging range. A line connecting the first imager and the second imager is slanted relative to a centerline of an overlapping area between the first imaging range and the second imaging range.

The imaging device 110 further includes a third imager (e.g., a camera 260*rr*) and a fourth imager (e.g., a camera 260*lr*). The third imager (e.g., a camera 260*rr*) is adjacent to the second imager (e.g., a camera 260*rf*) and has a third imaging range. A line connecting the second imager and the third imager is slanted relative to a centerline of an overlapping area between the second imaging range and the third imaging range.

The fourth imager (e.g., a camera 260*lr*) is adjacent to the first imager and the third imager, and has a fourth optical axis. A line connecting the first imager and the fourth imager is slanted relative to a centerline of an overlapping area between the first imaging range and the fourth imaging range. A line connecting the third imager and the fourth imager is slanted relative to a centerline of an overlapping area between the third imaging range and the fourth imaging range.

In another example of the imaging device 110, a first imager (e.g., a camera 260*lf*) has a first optical axis; and a second imager (e.g., a camera 260*rf*) has a second optical axis. A line connecting the first imager and the second imager is slanted relative to a bisector of an angle between the first optical axis and the second optical axis.

The imaging device 110 further includes a third imager (e.g., a camera 260*rr*) and a fourth imager (e.g., a camera 260*lr*). The third imager (e.g., a camera 260*rr*) is adjacent to the second imager (e.g., the camera 260*rf*) and has a third optical axis. A line connecting the second imager and the third imager is slanted relative to a bisector of an angle between the second optical axis and the third optical axis.

The fourth imager (e.g., a camera 260*lr*) is adjacent to the first imager (e.g., the camera 260*lf*) and the third imager (e.g., the camera 260*rr*), and has a third optical axis. A line connecting the first imager and the fourth imager is slanted relative to a bisector of an angle between the first optical axis and the fourth optical axis. A line connecting the third imager and the fourth imager is slanted relative to a bisector of an angle between the third optical axis and the fourth optical axis.

Optical axes of two adjacent imagers among the first imager, the second imager, and the third imager are asymmetric with respect to a perpendicular bisector of a line connecting the two adjacent imagers.

A line connecting two adjacent imagers among the first imager, the second imager, and the third imager is not orthogonal to a centerline of an overlapping area between two imaging ranges of the two adjacent imagers.

A line connecting two adjacent imagers among the first imager, the second imager and the third imager is not orthogonal to a bisector of an angle between the two adjacent imagers.

In the embodiments described above, a wearable imaging device 110 with multiple cameras 260 are described, but the embodiment is not limited to this form. In other words, the present embodiment can be applied to a device equipped with multiple cameras 260. Other examples besides the wearable device are described with reference to FIGS. 11A and 11B.

Figure 11A:
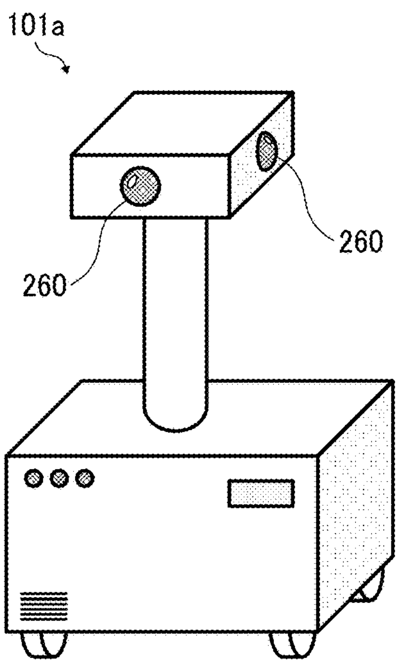
FIGS. 11A and 11B are diagrams each illustrating a mobile apparatus incorporating an imaging device.
Figure 11B:
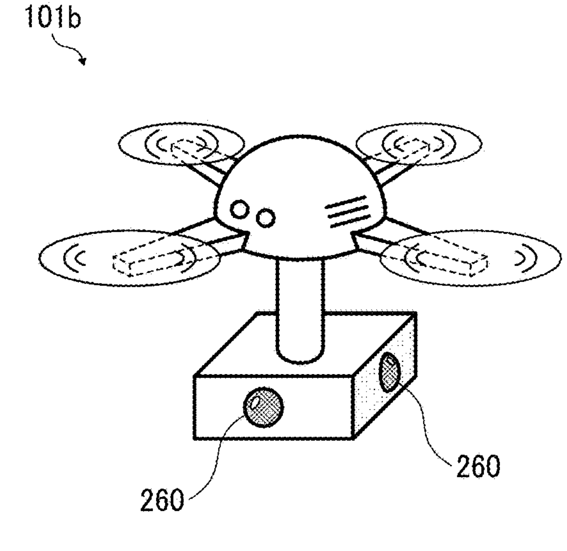

FIGS. 11A and 11B are diagrams each illustrating a mobile apparatus 101 incorporating an image-capturing device. FIGS. 11A and 11B illustrate an example of the mobile apparatus 101 including multiple cameras 260. FIG.

11A illustrates a robot mobile apparatus 101*a* equipped with wheels for traveling, which is an example of the mobile apparatus 101. FIG. 11B illustrates a mobile apparatus 101*b*, another example of the mobile apparatus 101, which moves by flying, like a so-called drone. The mobile apparatus 101 may move autonomously or be operated by a user.

The mobile apparatus 101*a* and 101*b* each include at least two cameras 260. In the mobile apparatus 101*a* and 101*b* of FIGS. 11A and 11B, the cameras 260 are arranged to reduce a disparity as illustrated in FIGS. 6A, 6B, 6C, and 6D. The disparity between the cameras can be reduced by applying the methods illustrated in FIGS. 7B, 8B, and 9B.

In the mobile apparatus 101 (e.g., the mobile apparatuses 101A and 101B) as illustrated in FIGS. 11A and 11B, the cameras are arranged to minimize the disparity between the cameras. This enables the capture of images that are easy to stitch together. This reduces the time for image processing, such as pattern matching.

According to one aspect of the present disclosure, an imaging device that captures images easy to stitch together, and a mobile apparatus incorporating the imaging device, are provided.

Each of the functions of the embodiments of the present disclosure can be implemented by a device-executable program written in, for example, C, C++, C #, and JAVA. The program according to the present disclosure can be stored in a device-readable recording medium to be distributed. Examples of the recording medium include a hard disk drive, a compact disk-read-only memory (CD-ROM), a magneto-optical disk (MO), a digital versatile disk (DVD), a flexible disk, an electrically erasable programmable read-only memory (EEPROM), and an erasable programmable read-only memory (EPROM). The program can be transmitted over a network in a form executable with another computer.

Although several embodiments of the present disclosure have been described above, embodiments of the present disclosure are not limited to the above-present embodiments, and various modifications may be made without departing from the spirit and scope of the present disclosure that can be estimated by the skilled person. Such modifications exhibiting functions and effects of the present disclosure are included within the scope of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An imaging device comprising:

a first imager having a first imaging range; and a second imager having a second imaging range, the second imager being asymmetrical relative to the first imager with respect to a centerline of an overlapping area between the first imaging range and the second imaging range to have a first disparity, a third imager adjacent to the second imager and having a third imaging range, the third imager being asymmetrical relative to the second imager with respect to a centerline of an overlapping area between the second imaging range and the third imaging range; and a fourth imager adjacent to the first imager and the third imager, and having a fourth imaging range, the fourth imager being asymmetrical relative to the first imager with respect to a centerline of an overlapping area between the first imaging range and the third imaging range, and the fourth imager being asymmetrical relative to the third imager with respect to a centerline of an overlapping area between the third imaging range and the fourth imaging range, wherein:

the first disparity is smaller than a second disparity of a hypothetical comparative imaging device comprising a comparative third imager having a comparative third imaging range and a comparative fourth imager having a comparative fourth imaging range, the comparative fourth imager is symmetrical relative to the comparative third imager with respect to the centerline of an overlapping area between the comparative third imaging range and the comparative fourth imaging range.

2. The imaging device according to claim 1, wherein:

the imaging device is a wearable device to be worn on a body of a user.

3. The imaging device according to claim 2, wherein:

the wearable device is to be worn on a head of the user.

4. The imaging device according to claim 1, wherein:

the first imager and the second imager are wide-angle cameras having an angle of view of 180 degrees or more.

5. The imaging device according to claim 1, further comprising:

a transmitter configured to transmit images captured by the first imager and the second imager to an information processing device via a network.

6. The imaging device according to claim 1, wherein:

the first imager and the second imager each include a lens optical system and a solid-state imaging element.

7. The imaging device according to claim 1, wherein:

the first imager is positioned at a right front of the imaging device and the second imager is positioned at a left front of the imaging device.

8. An imaging device comprising:

a first imager having a first optical axis;

a second imager having a second optical axis, the second optical axis being asymmetrical relative to the first optical axis with respect to a perpendicular bisector of a line connecting the first imager and the second imager;

a third imager having a corresponding third imaging range, the third imager being adjacent to the second imager and having a third optical axis, the third optical axis being asymmetrical relative to the second optical axis with respect to a perpendicular bisector of a line connecting the second imager and the third imager; and a fourth imager having a corresponding fourth imaging range, the fourth imager being adjacent to the first imager and the third imager, and having a fourth optical axis, the fourth optical axis being asymmetrical relative to the first optical axis with respect to a perpendicular bisector of a line connecting the first imager and the fourth imager, and the fourth imager being asymmetrical relative to the third imager with respect to a centerline of an overlapping area between the third imaging range and the fourth imaging range.

9. The imaging device according to claim 8, wherein:

the imaging device is a wearable device to be worn on a body of a user.

10. The imaging device according to claim 8, wherein:

the first imager and the second imager are wide-angle cameras having an angle of view of 180 degrees or more.

11. An imaging device comprising:

a first imager having a first imaging range;

a second imager having a second imaging range;

a third imager adjacent to the second imager and having a third imaging range; and a fourth imager having a fourth imaging range and being adjacent to the first imager and the third imager, and having a fourth optical axis, wherein:

a line connecting the first imager and the second imager is slanted relative to a centerline of an overlapping area between the first imaging range and the second imaging range, a line connecting the second imager and the third imager is slanted relative to a centerline of an overlapping area between the second imaging range and the third imaging range, a line connecting the first imager and the fourth imager is slanted relative to a centerline of an overlapping area between the first imaging range and the fourth imaging range, and a line connecting the third imager and the fourth imager is slanted relative to a centerline of an overlapping area between the third imaging range and the fourth imaging range.

12. The imaging device according to claim 11, wherein: the imaging device is a wearable device to be worn on a body of a user.

13. The imaging device according to claim 11, wherein: the first imager and the second imager are wide-angle cameras having an angle of view of 180 degrees or more.

14. An imaging device comprising:

a first imager having a first optical axis;

a second imager having a second optical axis;

a third imager adjacent to the second imager and having a third optical axis; and a fourth imager adjacent to the first imager and the third imager, and having a fourth optical axis, wherein:

a line connecting the first imager and the second imager is slanted relative to a bisector of an angle between the first optical axis and the second optical axis, a line connecting the second imager and the third imager is slanted relative to a bisector of an angle between the second optical axis and the third optical axis, a line connecting the first imager and the fourth imager is slanted relative to a bisector of an angle between the first optical axis and the fourth optical axis, and a line connecting the third imager and the fourth imager is slanted relative to a bisector of an angle between the third optical axis and the fourth optical axis.

15. The imaging device according to claim 14, wherein: the imaging device is a wearable device to be worn on a body of a user.

16. The imaging device according to claim 14, wherein: the first imager and the second imager are wide-angle cameras having an angle of view of 180 degrees or more.

17. A mobile apparatus comprising the imaging device according to claim 1.

18. The mobile apparatus according to claim 17, wherein: the mobile apparatus is a robot equipped with wheels for traveling.

19. The mobile apparatus according to claim 17, wherein: the mobile apparatus is a flying drone.

20. The mobile apparatus according to claim 17, wherein: the mobile apparatus moves autonomously.

* * * * *